United States Patent
Newlin et al.

(10) Patent No.: US 9,212,918 B1
(45) Date of Patent: Dec. 15, 2015

(54) SYSTEMS AND METHODS FOR GENERATING AND DISPLAYING MULTIPLE LAYERS ON A DIGITAL MAP

(71) Applicant: MapQuest, Inc., Denver, CO (US)

(72) Inventors: Meghan Newlin, Boulder, CO (US); Mark Husson, Denver, CO (US); John O'Dwyer, Denver, CO (US); Austin Brown, Denver, CO (US)

(73) Assignee: MapQuest, Inc., Denver, CO (US)

( * ) Notice: Subject to any disclaimer, the term of this patent is extended or adjusted under 35 U.S.C. 154(b) by 0 days.

(21) Appl. No.: 14/473,497

(22) Filed: Aug. 29, 2014

(51) Int. Cl.
*G01C 21/26* (2006.01)

(52) U.S. Cl.
CPC ..................................... *G01C 21/26* (2013.01)

(58) Field of Classification Search
CPC ............... G01C 21/26; G01C 21/3614; G01C 21/3611; G01C 21/3605; G01C 21/3673; G01C 21/3682
See application file for complete search history.

(56) References Cited

U.S. PATENT DOCUMENTS

| | | | |
|---|---|---|---|
| 2008/0243370 A1* | 10/2008 | Loera et al. | 701/201 |
| 2010/0305849 A1* | 12/2010 | Nirhamo | 701/206 |
| 2011/0313657 A1* | 12/2011 | Myllymaki et al. | 701/208 |
| 2013/0103314 A1* | 4/2013 | Moore et al. | 701/533 |
| 2014/0180820 A1* | 6/2014 | Louboutin et al. | 705/14.58 |
| 2015/0073941 A1* | 3/2015 | Burrows et al. | 705/26.62 |

\* cited by examiner

*Primary Examiner* — Rodney Butler
(74) *Attorney, Agent, or Firm* — Bookoff McAndrews, PLLC

(57) ABSTRACT

Systems and methods are disclosed for generating and displaying a POI data associated with multiple searches on a single digital map. Searches may be activated from pre-set layers within a layer panel. Searches may also be activated by adding custom layers.

20 Claims, 11 Drawing Sheets

SYSTEMS AND METHODS FOR GENERATING AND DISPLAYING MULTIPLE LAYERS ON A DIGITAL MAP

TECHNICAL FIELD

Various embodiments of the present disclosure relate generally to providing geographical mapping information. More specifically, exemplary embodiments of the present disclosure relate to systems and methods for identifying points of interest (POI) information related to multiple searches or categories.

BACKGROUND

In recent years, the use of digital maps and mapping applications has grown significantly. Such mapping applications may be executable by various types of user electronic devices. Examples of such devices include, but are not limited to, a computer connected to the Internet, an onboard navigation system in a vehicle, a dedicated portable Global Positioning System (GPS) device, a mobile computer device (e.g., a smartphone), a GPS-enabled computing device, etc. The displayed digital maps often convey information related to roads, traffic, buildings, landmarks, terrain, and other geographic locations or regions of interest. Most digital maps allow users to view various portions of a map (e.g., scrolling around, zooming in and out, etc.).

Some digital maps may be interactive, receiving user inputs such as an input of a specific geographic location, to view a map of that location and the surrounding locations. Some mapping applications may also include route guidance features allowing users to receive route information or driving directions to a particular address based on each user's input of a location or detection of each user's current geographic location, as derived through GPS or other location detecting means.

Some digital maps may also provide information about points of interest (POIs) at or near a location selected or specified by a user. A POI may be, for example, a specific business, destination, or attraction that is useful or interesting to an individual or a group of individuals, or that the individual or the group may want to visit. By way of example, POIs on a digital map may represent gas stations, rest areas, hotels, restaurants, museums, hospitals, historical sites, houses for sale, etc., and/or any other site in a specific geographic area. A POI may also correspond to a consumer retail location, such as a movie theater showing a particular film, a restaurant that serves a specific type of food, such as pizza, etc.

However, conventional mapping applications or services do not provide the ability to create, search, or save searches of multiple POIs or categories of POIs. This may cause users to expend excessive time and effort in locating POIs.

SUMMARY OF THE DISCLOSURE

Accordingly, a need exists for methods, systems, and devices that allow users to save a search query for quick and consistent access and display of multiple "layers" of pre-set and/or custom POI searches.

According to certain embodiments, methods are disclosed for searching and displaying multiple layers of points of interest on a digital map, the method comprising: receiving, from a user's electronic device and over a network, a location; displaying, on the user's electronic device, a layers panel, and a digital map of the location and an area around the location; receiving, from a user's electronic device and over a network, a first selection from the layers panel; retrieving, from an electronic database, points of interest (POIs) associated with the first selection; displaying, within the digital map, the POI data associated with the first selection; receiving, from a user's electronic device and over a network, a second selection from the layers panel; retrieving, from an electronic database, POIs associated with the second selection; and displaying, within the digital map, the POI data associated with the second selection.

The method may include any one of, or a combination of, the following steps and/or features: wherein at least one of the first selection and the second selection is a pre-set layer; setting the pre-set layer based on popularity of POIs; adding a custom layer to the layers panel; wherein adding a custom layer to the layers panel, comprises: receiving, from a user's electronic device and over a network, a selection to add a custom layer; retrieving, from an electronic database, points of interest (POIs) associated with the custom layer; displaying the custom layer in the layers panel; without additional user action, displaying within the digital map, the POI data associated with the custom layer; receiving, from a user's electronic device and over a network, a selection of the custom layer from the layer panel; and displaying within the digital map, the POI data associated with the custom layer; displaying a list of popular custom layers for the user to select as the custom layer; wherein the list of popular custom layers consists of category layers; providing the user with a text box to enter text associated with a desired custom layer; wherein the added custom layer may be a category layer or a franchise layer; wherein at least one of the first selection and the second selection is a custom layer; receiving, from a user's electronic device and over a network, a third selection from the layers panel; retrieving, from an electronic database, POIs associated with the third selection; displaying, within the digital map, the POI data associated with the third selection; receiving, from a user's electronic device and over a network, an instruction to clear all layers; and removing, from the digital map, the POI data associated with the first selection and the second selection; receiving, from a user's electronic device and over a network, an instruction to delete a layer from the layers panel; and removing, from the layers panel, the selected layer; wherein the digital map includes a navigation route; receiving input to filter the POI data; and filtering the POI data associated with the first selection and the second selection; wherein the displayed POI data is interactive.

According to certain embodiments, systems are disclosed for searching and displaying multiple layers of points of interest on a digital map. One system includes a memory having processor-readable instructions stored therein and a processor configured to access the memory and execute the processor-readable instructions, which when executed by the processor configures the processor to perform a plurality of functions, including functions to: receive, from a user's electronic device and over a network, a location; display, on the user's electronic device, a layers panel, and a digital map of the location and an area around the location; receive, from a user's electronic device and over a network, a first selection from the layers panel; retrieve, from an electronic database, points of interest (POIs) associated with the first selection; display, within the digital map, the POI data associated with the first selection; receive, from a user's electronic device and over a network, a second selection from the layers panel; retrieve, from an electronic database, POIs associated with the second selection; and display, within the digital map, the POI data associated with the second selection.

According to certain embodiments, a computer readable medium is disclosed as storing instructions that, when executed by a computer, cause the computer to perform functions to: receiving, from a user's electronic device and over a network, a location; displaying, on the user's electronic device, a layers panel, and a digital map of the location and an area around the location; receiving, from a user's electronic device and over a network, a first selection from the layers panel; retrieving, from an electronic database, points of interest (POIs) associated with the first selection; displaying, within the digital map, the POI data associated with the first selection; receiving, from a user's electronic device and over a network, a second selection from the layers panel; retrieving, from an electronic database, POIs associated with the second selection; and displaying, within the digital map, the POI data associated with the second selection.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
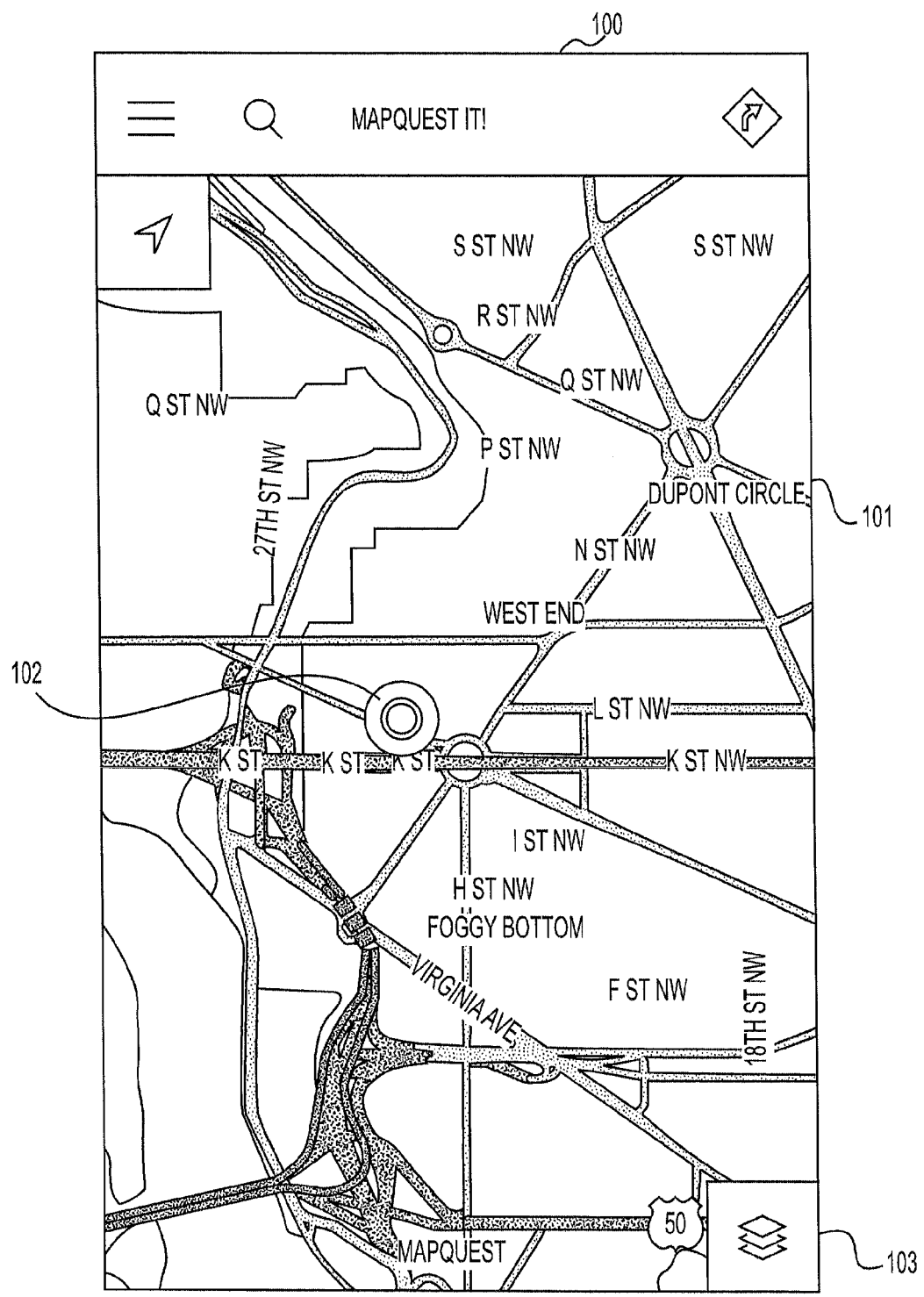
FIG. 1 is a schematic view of an exemplary graphical user interface (GUI) of a current location on a digital map and an interactive layers icon, according to an exemplary embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems for generating a digital map with the locations of POIs based on multiple search queries. A user may search for multiple types or categories of POIs, and all searched POIs may be represented on the digital map. A layer may be the results of a searched POI. For example, the user may search for "Beaches," and an indicator representing beaches may be displayed on a digital map. This may be a first layer. If the user then wanted an indicator of the locations of coffee shops so he/she could go to a beach with coffee on the way, the user may then enter a second layer, "Coffee." Indicators representing beach locations and coffee shop locations may both be displayed within the same user device screen, on the same digital map, and/or along the route. Layers and POI indicators may remain available within the GUI even if the user exits and reopens the application. This may allow the user to easily search for and view POIs he/she often uses.

Referring now to the figures, FIGS. 1, 2, 5, and 6 are illustrations of different views of a GUI 100 having a graphical representation of a digital map 101 with a current location 102 of the user/user device, and a layers request icon 103. The digital map 101 may include various geographic information represented in any suitable manner, such as text, symbols, borders, etc. The GUI 100 may be provided by a mapping service provider or any other entity.

The digital map 101 may be of any suitable form and/or type of view, such as a map view, satellite view, live traffic view, etc. The digital map 101 may be any suitable size to be displayed by an electronic device and its view may be manipulated, (e.g., zoomed in and out, rotated, etc.). The digital map 101 may be of any scale, e.g., transcontinental, continental, region, state, city, neighborhood, campus, etc. The digital map 101 also may include various identifiers, e.g., geographic markers landmarks, road names, etc. and may be automatically electronically updated.

In some embodiments, the GUI 100 may be accessible (e.g., for viewing and interacting) on a website accessible by an electronic device. In other embodiments, the GUI 100 may be accessible on a mobile navigation application of an electronic device. In such embodiments, the view of the digital map 101 may be automatically updated or panned over based on detecting, via GPS or in any other suitable manner, the current location of the electronic device.

In some embodiments, locator 102 may represent the current location of the user or user device. In such embodiments, the location of locator 102 may be determined, for example, based on detecting, via GPS or in any other suitable manner, the current location of the electronic device. In other embodiments, locator 102 may represent a location input by the user for the digital map and the user selected queries to be centered around. For example, a user may currently be located in the suburbs, but wish to find food downtown. In such an example, the user may input an address downtown. Locator 102 may represent that address and the digital map may displayed of that location and the surrounding areas. The user may input the location for locator 102 in any way. For example, the user may enter text indicating a city, intersection, address, etc. The user may select a location on digital map 101 by, for example, clicking or touching a location or by dropping a pin. Layers request icon 103 may be selected by the user to activate the layer functionality and/or display a layers panel, as described in further detail below with respect to FIG. 2.

Figure 2:
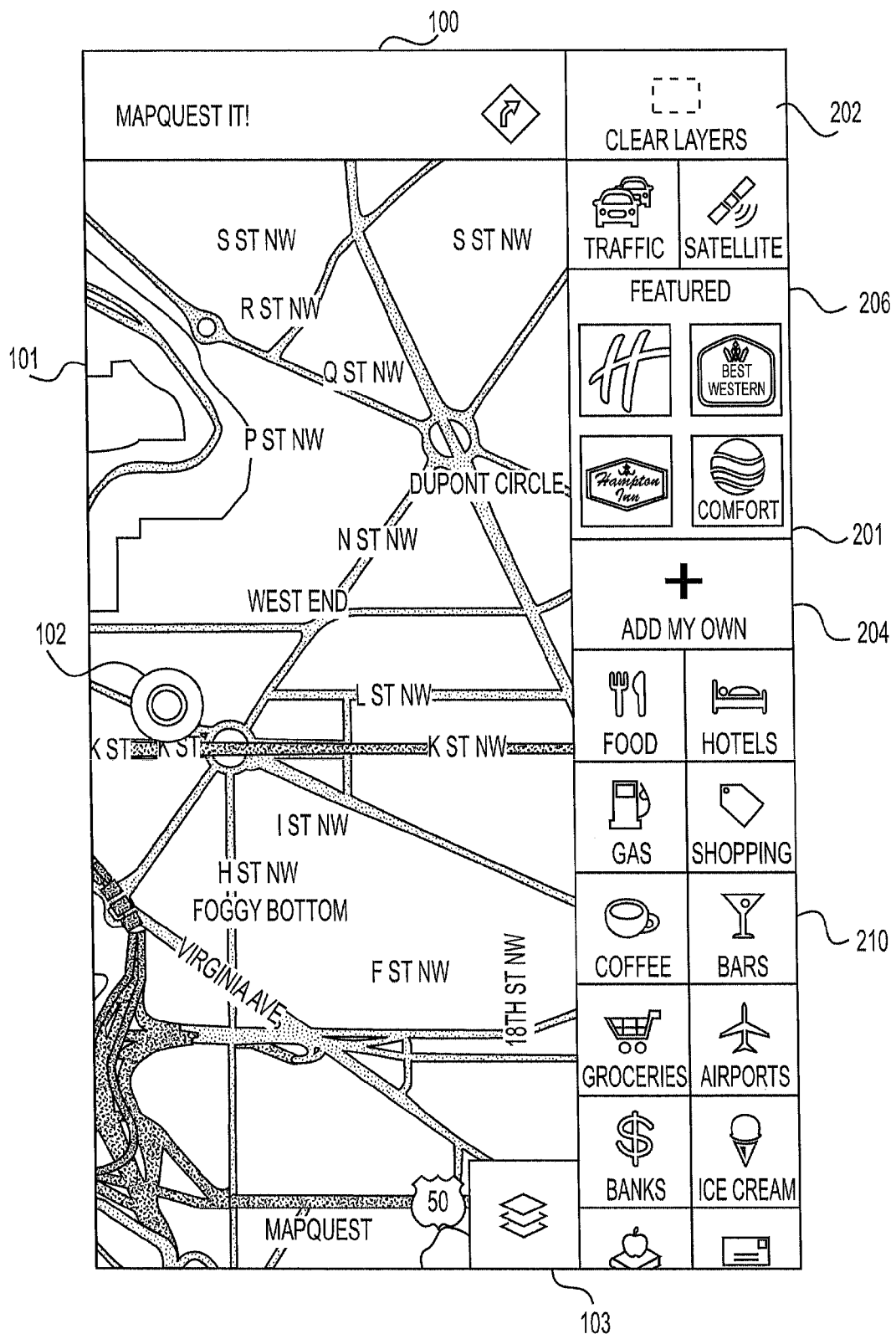
FIG. 2 is a schematic view of an exemplary GUI of the current location on the digital map and a layers panel, according to an exemplary embodiment of the present disclosure.

FIG. 2 is a schematic view of an exemplary digital map 101 and layers panel 201 of GUI 100. The layers panel 201 may be displayed, for example, on the same screen as the digital map 101, as an overlay, and/or in a separate screen. In the example illustrated in FIGS. 2 and 5-7, the layers panel is displayed as vertical and sharing the screen with digital map 101, but it should not be limited thereto. Layers panel 201 may have any configuration, size, and/or shape. In some embodiments, the GUI 100 may be on an application on a mobile device and the layers panel 201 may be displayed in response to receiving the current location of the mobile device (e.g., identified via GPS, etc.). In some embodiments, the layers panel 201 may be displayed in response to the user selecting and/or activating interactive layers request icon 103.

The layers panel 201 in GUI 100 may include, for example, a clear layers portion 202, featured layers portion 206, add layers portion 204, and/or available layers portion 210. The digital map 101, layers panel 201, and/or different portions of each, may be positioned in any suitable manner on the GUI 100 and may be enlarged, reduced, or minimized by the user using any suitable user interaction tools (e.g., mouse, touchscreen, keyboard, stylus, etc.) In addition to the size and zoom level of the portions being manipulated, portions of the GUI 100 may be selected to receive additional data. Each of the portions of layers panel 201 and/or elements within these portions, may be selected by the user in any suitable manner (e.g., via touchscreen selection, selection using a mouse, etc.) and the user may be prompted to input further information. For example, the add layers portion 204 may be selected by the user, (e.g., using the touchscreen, or mouse) and the user may be prompted to receive text related to the layer/POI the user desires to search.

The featured layers portions 206 may include POIs or content, such as electronic advertisements received from an external content and/or ad server based on the current location, user demographics, time of day, etc. For example, Best Western may have agreed to pay for a featured layer and as a result, a Best Western layer may be displayed in the featured layers portion 206. Additionally or alternatively, Best Western may have paid for a layer in the featured layers portion 206 for all users or just users within a specific geographic area. As illustrated in FIGS. 2 and 5-7, the featured layers portion 206 may include franchise layers, specific to one company. The interactive layer box/square within the featured layers portion 206 may have graphics specific to the featured franchise (e.g., the company name, and/or the company logo.)

The available layers portion 210 may include any number of layer icons, displayed in any way. For example, the available layers may include interactive squares/boxes like, e.g., in FIG. 2. The available layers may also be a list, symbols, or any other shape/design. The layers within this portion may be available for selection. Once selected, a query may be made to determine if there are any POIs related to the layer within the geographic area represented by the displayed portions of digital map 101. If there are any POIs within the current digital map 101, a symbol representing each POI may be displayed at the location of the POI on digital map 101. This symbol may be any shape, size, and/or design. The symbol may be different for each layer or each POI itself. A user may select any number of layers from the available layers portion 210 and/or featured layers portion 206. The selection of layers from the available layers portion 210 and the display of corresponding POIs in the digital map 101 will be described in further detail below with respect to FIGS. 5-7.

Initially, available layers portion 210 may have any number of layers. For example, available layers portion 210 may include no layers until the user adds one. Additionally or alternatively, the layers panel may initially have various/pre-set layers. For example, the layers initially displayed in the available layers portion may be selected randomly. The layers in the available layer portion may also be pre-set by the server, app developer, content provider, etc. The pre-set layers may be determined based on the most popular searches. In the example illustrated in FIG. 2, the exemplary pre-set layers are those most often search for in a navigation search engine. This may be based on, for example, users as a whole, this user, or users with the same demographic as this user. The pre-set layers may be based on the current season (e.g., a layer for the beach in the summer and/or a Christmas tree farm in December). Pre-set layers may be based on which layers other users in this user's demographics are selecting and/or adding to the layers panel 201. Pre-set layers may be based on which companies/categories are paying for a particular layer to be an initial layer. For example, Starbucks may pay to have a layer that, when selected, displays visual indicators where all the Starbucks are within the currently displayed/viewable digital map 101. This may be in addition to and/or as an alternative to the featured layer portion 206 (described above).

The layers may be based on the time of day. For example, during lunch time (e.g., 11 a.m. to 2 p.m.) one layer may be lunch places or sandwiches shops. Further, at 6 p.m., the displayed layers may relate to dinner locations or happy hour bars. The layers may be pre-set to include the most common layer requested during that time of day. Similarly, the pre-set layers may be based on location. For example, if the mobile device is at a shopping mall, the pre-set layers may be the most commonly searched for POI related to shopping centers, or the pre-set layers may be the user's favorite/most searched for stores. Similarly, if the current location is recognized as or designated by the user as his/her work, it may be assumed the user will search for a lunch place and the pre-set layers may include a variety of lunch places like, for example, sandwich shops, Thai restaurants, etc.

Once the initial layers are determined, the user may not have the ability to make other searches, and may be limited to only those layers pre-set in the available layers portion 210 and/or featured layers portion 206. Additionally or alternatively, the user may have the ability to customize portions of the layers panel 201, including but not limited, the available layers portion 210. For example, the user may be able to change the order of the layers within layer panel 201 and/or available layers portion 210. The user may be able to customize the layers panel by changing its size, shape, and/or location on GUI 100. The user may be able to change the way the layers are displayed (e.g., list vs. square). The user may add custom layers to the layers panel 201, featured layers portion 206, and/or available layers portion 210. For example, the user may select "Add my own" from the add layers portion 204 of the GUI 100. Adding custom layers will be discussed in further detail below with respect to FIGS. 3-6.

Clear layers portion 202 may take any shape, color, and/or be in any location within the GUI 100. A user may select clear layers portion 202 at any time, including but not limited to, when there is only one layer currently selected, when there are multiple layers currently selected, and/or when pre-set layers, featured layers and/or added/custom layers are selected. The clear layers portion 202 may clear layers all at once, by category, and/or one at a time. In some implementations, selecting the clear layers portion 202 will remove all POI indicators from the digital map 101. In other implementations, only some POI indicators may be removed. For example, the user may be asked which specific layers he/she wants cleared. In another example, the user may be asked whether only custom/added layers, pre-set layers, and/or featured layers should be removed.

Figure 3:
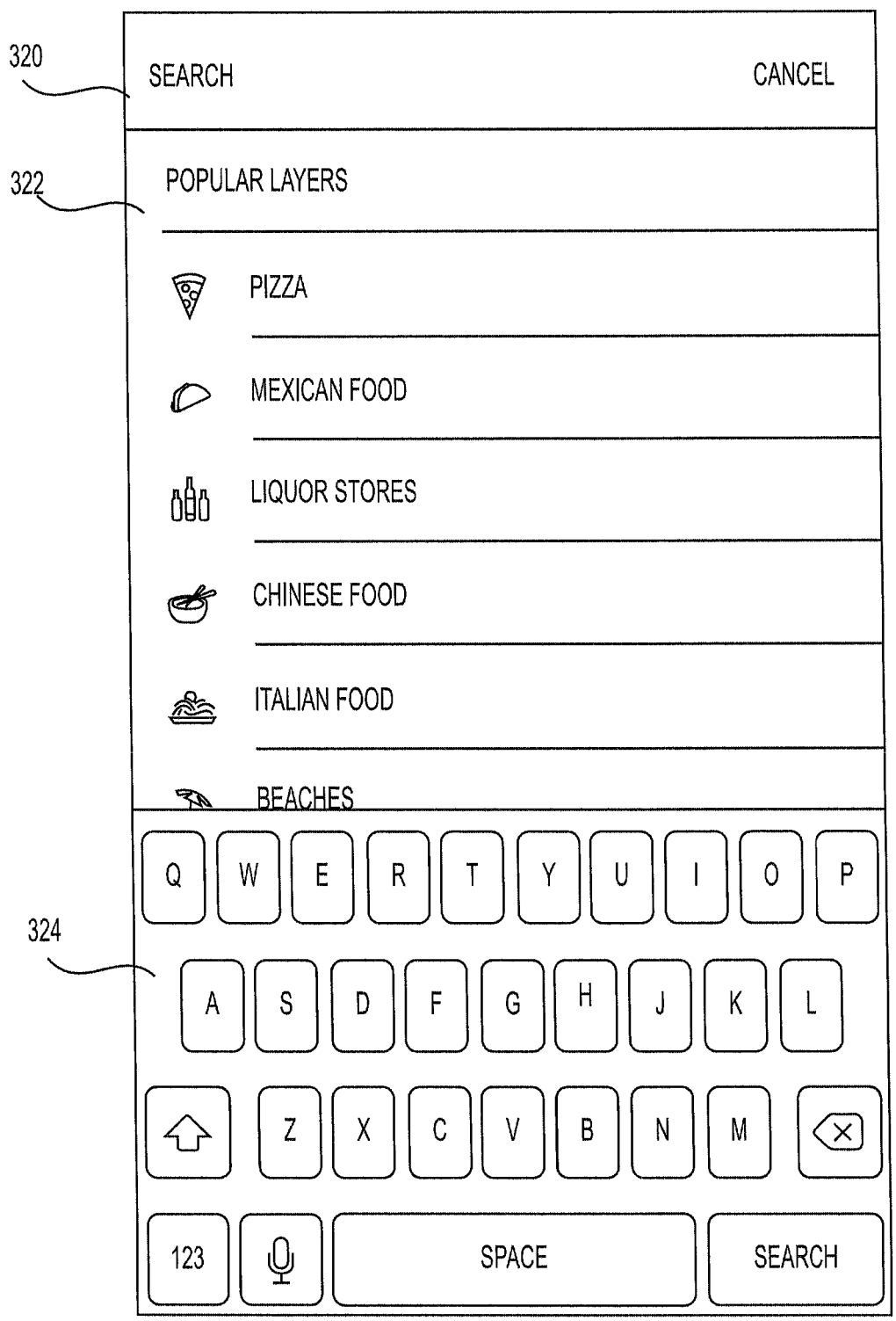
FIG. 3 is a schematic view of an exemplary GUI of the custom layers search screen, according to an exemplary embodiment of the present disclosure.
Figure 4:
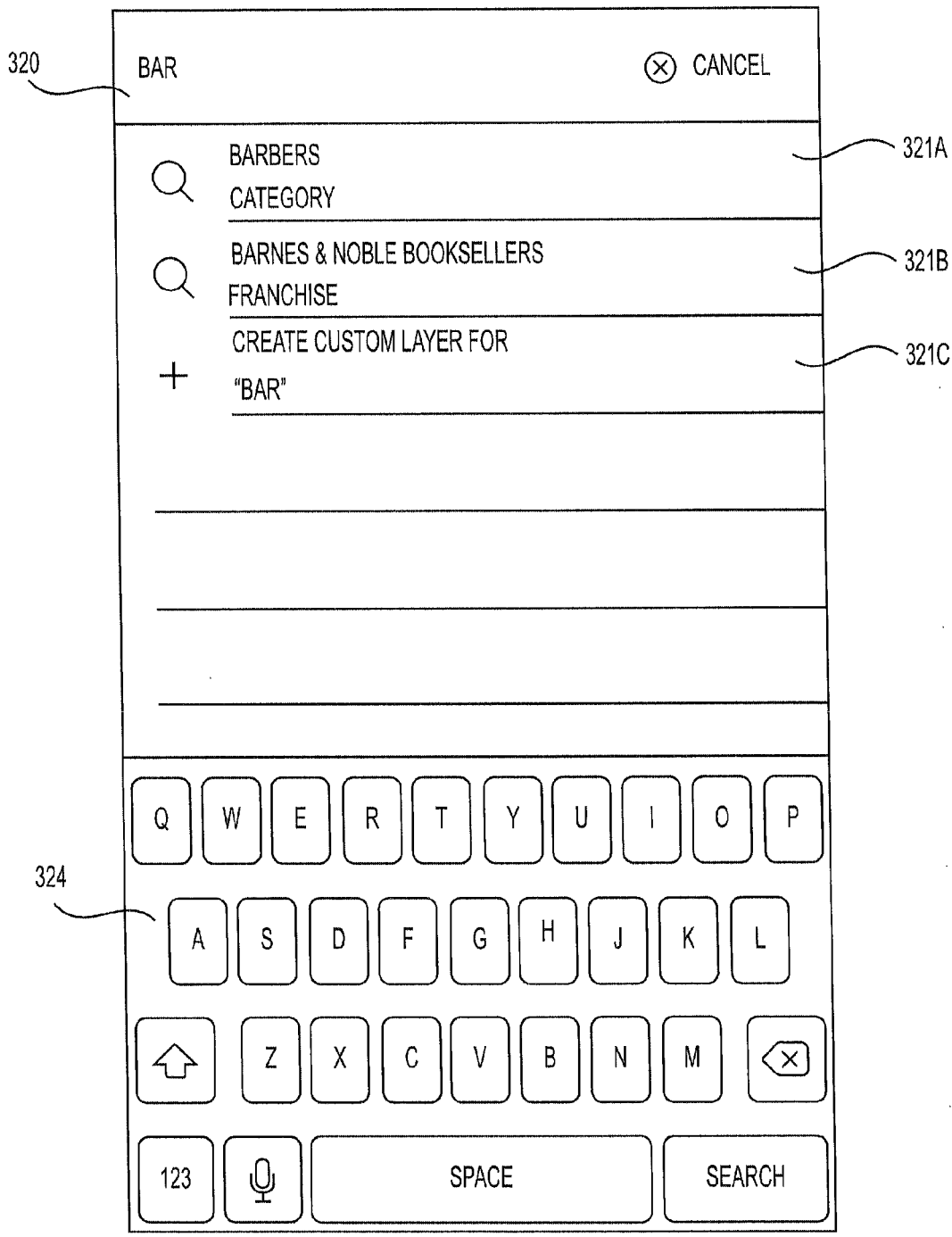
FIG. 4 is a schematic view of an exemplary GUI of the custom layers search screen after a user has initiated a search by entering text, according to an exemplary embodiment of the present disclosure.

FIGS. 3 and 4 are illustrations of different views 300 and 400 of GUI 300 after an input to add a custom layer is received from the user. For example, the add layers portion 204 of FIG. 2 may be selected by a user. GUI 300 may include text box (search function) 320, popular layers portion 322 (as seen in FIG. 3), searched layers 321 (as seen in FIG. 4), and/or input portion 324. These screens may appear at any point after a user indicates he/she wishes to add a layer. For example, some implementations do not require the add layers portion 204 to be selected. In some implementations, the GUI of FIGS. 3 and 4 may be displayed in a separate screen, in the same screen with the digital map 101 of FIGS. 1, 2, 5, and/or 6, in the same screen with the digital map 701 of FIG. 7, and/or as an overlay on digital map 101 and/or 701.

In FIG. 3, the user may have selected the add layers portion but may not have input text for a search yet. The popular layers portion 322 may be displayed to the user layers he/she may select in order to customize the layers panel 201 of FIGS. 1, 2, 5-7, and/or available layers portion 210 of FIGS. 1, 2, 5-7. These "popular layers" may be determined in any way, including those most popular custom layers for the entire world, the country in which the user is searching, or the user's demographic.

Input portion 324 may not be limited to the shown keyboard, but may include any type or combination of input devices, such as a display monitor, touchpad, touchscreen, microphone, camera, keyboard, and/or mouse. Any POI the user wants to search for may be entered into input portion 324. The text of what the user searches for may be displayed in text box 320. For example, in FIG. 4, the user may have entered the letters "b," "a," and "r." These letters may appear in text box 320. Once the user begins to input a search, the searched layers portion 321 may include any matching POIs, including category POIs 321A, like e.g., "barbers," franchise POIs 321B, like e.g., "Barnes and Noble," or create custom layer 321C, like e.g., "bar." Category POIs 321A and franchise POIs 321B, may be known or previously created layers. For example, other users may have previously searched for barbers. The created custom layer 321C, may be letters or a phrase unknown to the server, app, etc. By selecting a create custom layer 321C, POIs containing the letters within text box 320 or create custom layer 321C may be searched for and/or represented on a digital map (e.g., digital map 101 of FIGS. 1, 2, 5, and/or 6, and/or digital map 701 of FIG. 7).

Once a user selects any of the layers from searched layers portion 321, including category POIs 321A, franchise POIs 321B, and/or create custom layer 321C, an interactive layer may be added to the layers panel indicating the selected layer and/or POI indicators may be added to the digital map (e.g., digital map 101 of FIGS. 1, 2, 5, and/or 6, and/or digital map 701 of FIG. 7) at locations of POIs associated with the selected layer.

Figure 5:
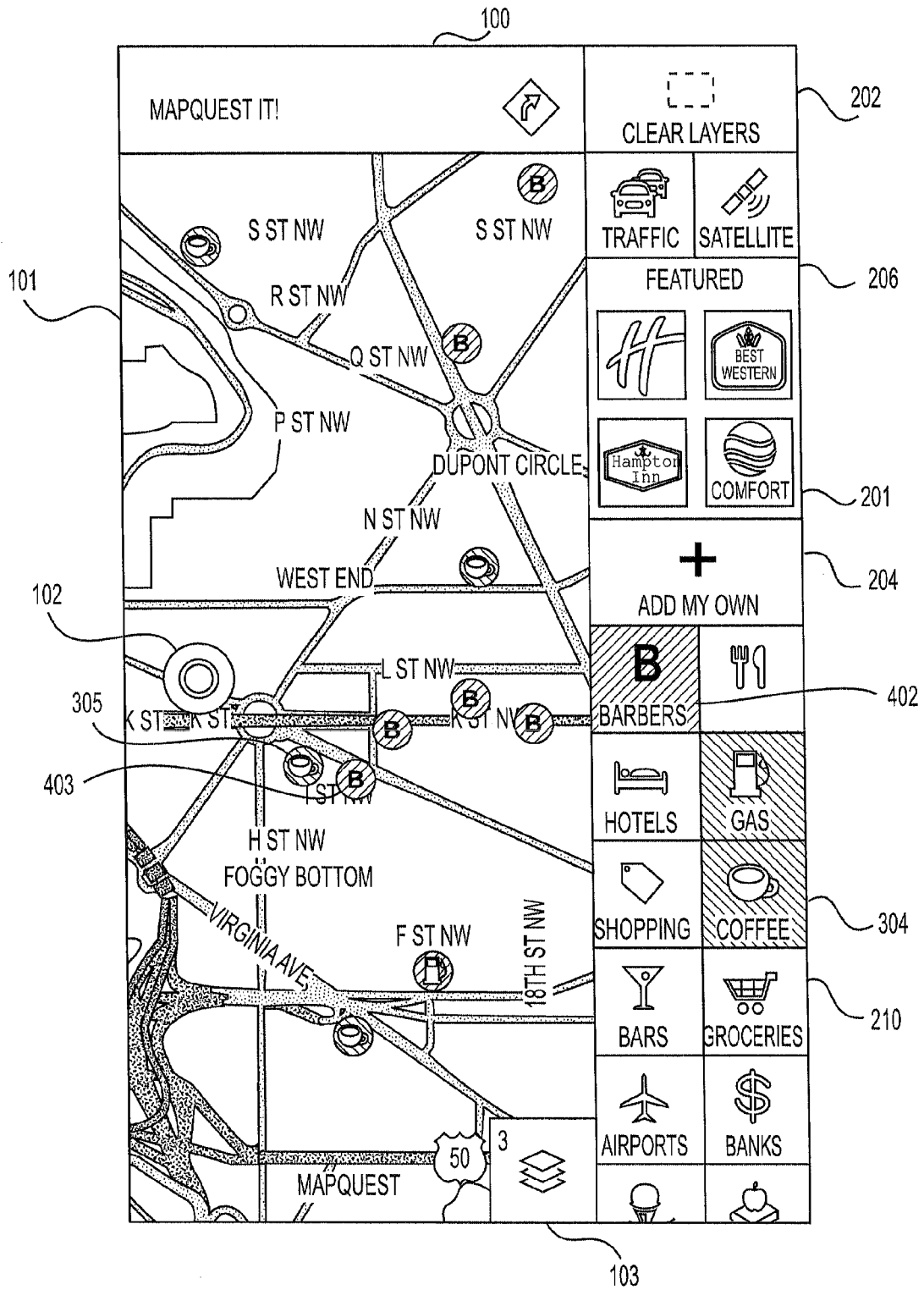
FIG. 5 is a schematic view of an exemplary GUI of the current location on the digital map, the layers panel with multiple layers for querying the POIs, and the results of multiple queries represented on the digital map, according to an exemplary embodiment of the present disclosure.
Figure 6:
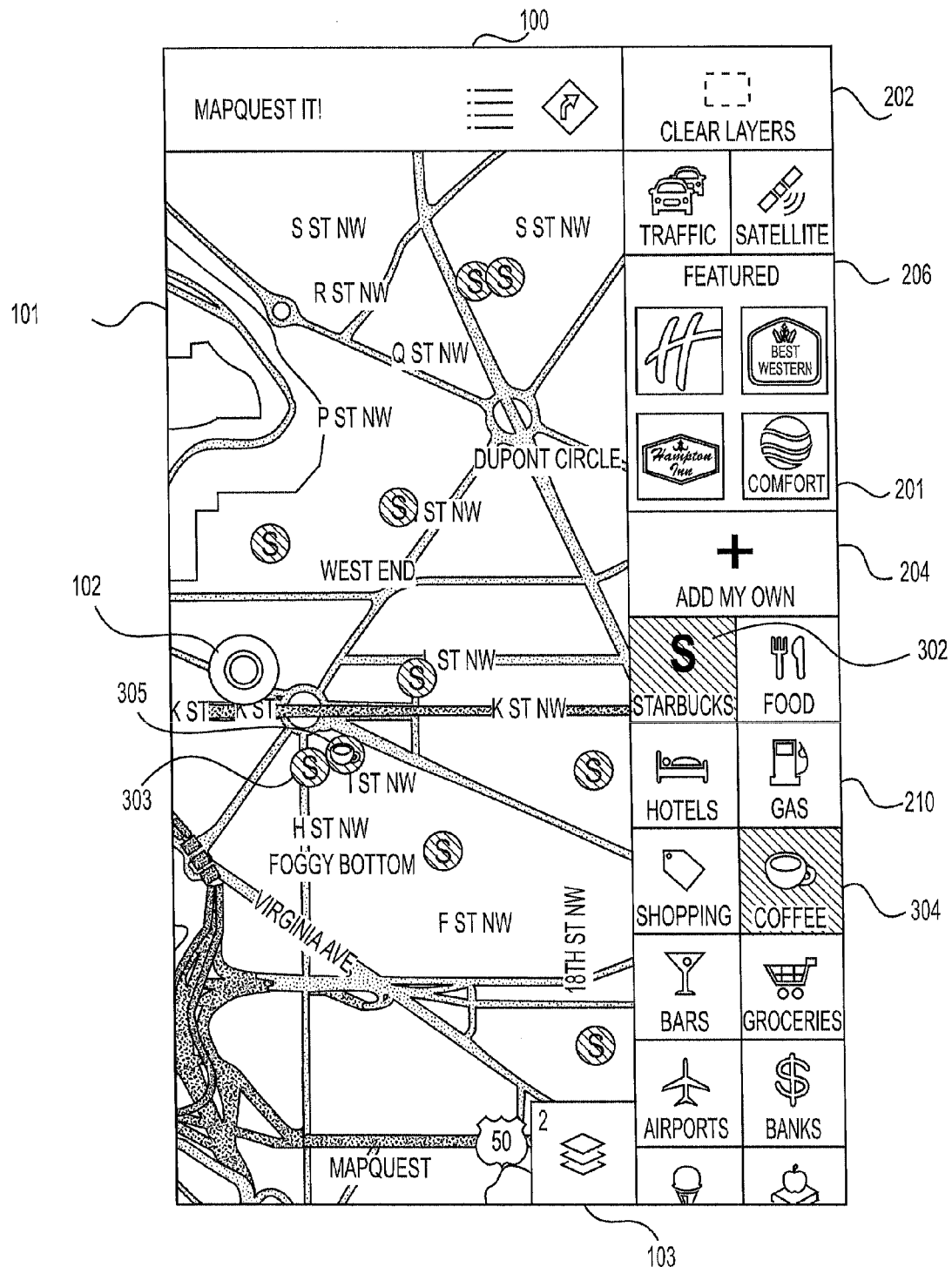
FIG. 6 is a schematic view of an exemplary GUI of the current location on the digital map, the layers panel with multiple layers for querying the POIs, and the results of multiple queries represented on the digital map, according to an exemplary embodiment of the present disclosure.

FIGS. 5-6 are illustrations of different views of a GUI 100 having a graphical representation of a digital map 101 with a current location of the user/user device 102, a layers request icon 103, representations of the results of multiple POIs searches/layers. Within GUI 100 may also be a layers panel 201, selected pre-set layer 304, and added/custom layers 302 and 402.

As described above, a user may select any layer (including but not limited to, layers in the featured layers portion 206, layers in the available layers portion 210, pre-set layers, and/or added/custom layers). For example, layer 304, may be a pre-set layer, provided initially from the app developer, third party provider, content provider, or created and saved by the user from a previous use. The user may select any layer in any way, including but not limited to, receiving an advertisement to add a layer, inputting text or a voice command to search for a layer, etc. In the examples illustrated in FIGS. 5-6, the user selected pre-set layer 304, "Coffee." This selection may be performed before or after adding custom layers. Once a user selects the "Coffee" layer, a query is performed, requesting the locations associated with the term "coffee" within the geographic location represented by digital map 101. POI indicators may then be displayed within digital map 101 at the locations associated with the selected layer. In the examples illustrated in FIGS. 5 and 6, coffee indicators 305 may indicate the location of a POI associated with the selected pre-set layer 304, coffee. The POI indicators may be any symbol, size, color, shape. For example, the indicators for each layer may be associated with the layer itself; such as a dollar sign at each bank location or the letter "S" at each Starbucks. The POI indicators may also be circles, stars, or any other shape.

The POI indicators within the digital map 101 may be interactive. For example, by selecting a POI indicator, the user may receive further details regarding that particular search results, including but not limited to, the name of the POI, a link to the website, hours of business, distance from current and/or user inputted locations, and/or directions to POI from the current and/or user inputted location.

In the example illustrated in FIGS. 5-6, a coffee mug inside a circle, coffee indicator 305, may be displayed at each location associated with coffee. In such an embodiment, the user may select coffee indicator 305 within digital map 101 and receive information, such as, that coffee shop is a Starbucks, it is located 0.2 miles away for the user's current location 102, and it is open until 10 p.m. The user may also narrow his/her search via the interactive indicators. For example, after selecting a coffee indicator 305, the user may be informed it is a Starbucks. If the user prefers Dunkin Donuts coffee, however, the user may then add a custom layer (as described below in further detail) or create a filter (as described below in further detail).

As described above, a user may customize the layers panel by adding layers beyond those pre-selected. There may be any number of added/custom layers. The added/custom layers may be added anywhere within the GUI, for example, in the layers panel 201 or the available layers portion 210. The added/custom layers may be permanently added to the layers panel, may be removed after one search, or may be removed at the user's, content provider's, and/or app developer's discretion.

In one implementation, the user may add a layer by selecting "Add my own," or the add layers portion 204 of the layers panel 201. As described above with respect to FIGS. 3-4, the user may then input the desired search. The input may be configured to allow the user to input information in any suitable manner, for example, via a touchscreen, mouse, keyboard, etc. The input may include various user elements into which the user may submit information, such as options to select what information e.g., categories of POIs, and/or franchise POIs, is displayed.

FIG. 5 shows the GUI 100 when the user selects multiple layers. In one example, at least one of these layers may be an added/custom category layer. The added/custom layer may be a generic category, similar to those shown in the initial layer panel of FIG. 2. Generic layers may include, but are not limited to, barbers, salons, schools, convenient stores, hardware stores, parks, pools, etc. A user may also add a generic layer in any way, including but not limited, the ways described above with respect to FIGS. 3-4.

FIG. 5 shows the GUI 100 when the user selects multiple layers. In the example illustrated thereon, the user has selected pre-set layers "Coffee" and "Gas," and added a custom layer for a category POI, "Barbers." POI indicators for the results of all three layer queries are displayed. Locations associated with the "Barbers" added/custom layer 402 may be represented on digital map 101 by barber indicator 403. Locations associated with the pre-set coffee layer 304 may be represented by a coffee indicator 305, for example, coffee cup within a circle. This may enable the user to search for and easily locate a coffee shop close to a barber by going to a location with both POI indicators, barber indicator 403 and coffee indicator 305.

Additionally or alternatively, a user may add a layer for a franchise. For example, as shown in FIG. 6, the user has selected pre-set layer "Coffee," and added a custom layer for a specific brand, e.g., "Starbucks." POI indicators for the results of both layer queries are displayed; Starbucks locations are represented with Starbucks indicator 303, such as an "S" inside a circle, and coffee indicator 305. This may enable the user to search for and easily locate Starbucks coffee shops by going to a location with both POI indicators, Starbucks indicator 303 and coffee indicator 305.

It should be noted that GUI 100 may change in any way once an added/custom layer is selected to be added, for example, by selecting a layer from popular layers portion 322 in FIG. 3 or searched layers portion 321 of FIG. 4. For example, a new layer (e.g., an interactive box or square) may be added to layers panel 201, but a query may not yet be performed. Additionally or alternatively, once selected, a query for related POIs may be performed and the resulting locations associated with the selected layer be displayed on a digital map (e.g., digital map 101 of FIGS. 1, 2, 5, and/or 6, and/or digital map 701 of FIG. 7).

Figure 7:
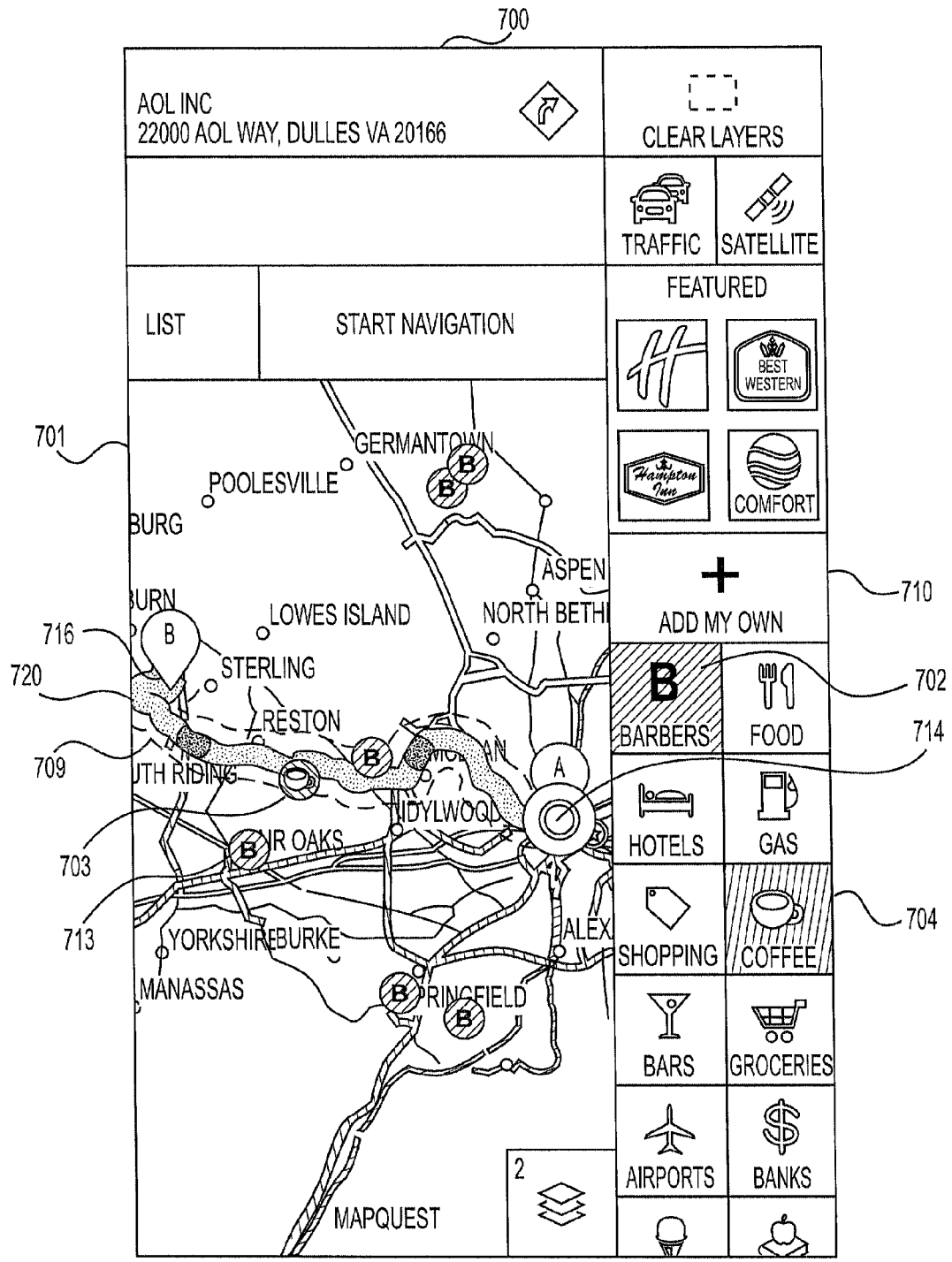
FIG. 7 is a schematic view of an exemplary GUI of a route on a digital map, the layers panel with multiple layers selected, and the results of multiple queries represented on the digital map, according to an exemplary embodiment of the present disclosure.

Referring now to FIG. 7, a schematic view is depicted of an exemplary GUI 700 including a graphical representation of a digital map 701 with a route 720 between a start location 714 and a destination location 716. Generation of digital map 701 may involve accessing and retrieving pre-calculated POI data along route 720. The digital map 701 may include various geographic information represented in any suitable manner, such as text, symbols, borders, etc. The GUI 100 may be provided by a mapping service provider or any other entity.

The digital map 701 may be of any suitable form and/or type of view, such as a map view, satellite view, live traffic view, etc. The digital map 701 may be any suitable size to be displayed by an electronic device and its view may be manipulated, (e.g., zoomed in and out, rotated, etc.). The digital map 101 may be of any scale, e.g., transcontinental, continental, region, state, city, neighborhood, campus, etc. The digital map 101 also may include various identifiers, e.g., geographic markers landmarks, road names, etc. and may be automatically electronically updated.

In some embodiments, the GUI 700 may be accessible (e.g., for viewing and interacting) on a website accessible by an electronic device. In other embodiments, the GUI 700 may be accessible on a mobile navigation application of an electronic device. In such embodiments, the view of the digital map 701 may be automatically updated or panned over based on detecting, via GPS or in any other suitable manner, the current location of the electronic device.

The digital map 701 may include a route 720 between a start location 714 and one or more destination locations 716. The start and/or destination locations 714, 716 may be any locations identifiable on the digital map, for example, a specific address (e.g., 123 Green St. Any town, Calif.), point of interest ("POI") location (e.g., Wrigley Field), general geographic location (e.g., Denver, Colo.), intersection (e.g., $1^{st}$ St. and Broadway, exit 29A), etc. The start and destination locations 714, 716 may be any distance from each other and/or any direction relative to each other. The route 720 may be determined or received in any way.

The route 720 may be along one or more portions of local streets, highways, bridges, etc. The route 720 may be traversed in any suitable manner, e.g., via motor vehicle, bicycle, foot, public transit, plane, boat, etc. The route 720 also may include various visual indicators to identify various attributes of the route 720. For example, traffic flow along the route 720 at various times may be identified using different colors or combination of colors, visual effects (e.g., animation, pop-up notes, etc.), etc. Road restrictions, tolls, bridge heights, construction, etc., also may be shown along the route 720.

The GUI 700 also may include a layers panel 710. Layers panel 710 may include features and/or portions similar to layers panel 201 of FIGS. 2, 5-6. For example, layers panel 710 may include available layers portion 711, which may be similar to available layers portions 210 of FIGS. 2, 5-6). Available layers portion 711 may include pre-set layers (e.g., coffee layer 704) and/or added/custom layers (e.g., barbers layer 702.) Once a layer is selected, the entire visible map (e.g., currently displayed map 701) may be searched for POIs related to the layer. Additionally or alternatively, POIs may be searched for along the route, e.g., at exits. For example, POIs associated with intersections and/or exits may be determined in the manner described in U.S. application Ser. No. 14/161,636, filed on Jan. 22, 2014.

In some implementations, the results of a search for POIs may be filtered. These filters may be set by anyone including, but not limited to, the user or the application developer. For example, a user may set a filter to show only POI indicators with a rating greater than e.g., three stars. A user may set a filter to show only POIs that are currently open. An application developer may display only POI indicators when the company associated with the POI pays for their POI to be displayed. In another example, a POI indicator may not be displayed unless it is within a certain distance from the route. Referring now to FIG. 7, a filter may be applied to display only POIs indicators within one mile of the route. Line 709 of FIG. 7 represents one mile from the route. In one embodiment, any POI outside this mile may be hidden. For example, coffee indicator 703 may be displayed because it is between line 709 and route 720. However, barber indicator 713 may be hidden because it is not within one mile of the route. Similarly, POIs can be filtered by estimated travel time. For example, POIs may be filtered so they are not displayed if it would take more than e.g., 10 minutes to travel to the location from the current and/or user inputted location (e.g., location 102 of FIGS. 2, 5-6). In another embodiment, POIs may be filtered so they are not displayed if it would add more than e.g., 5 minutes to total travel time.

Figure 8:
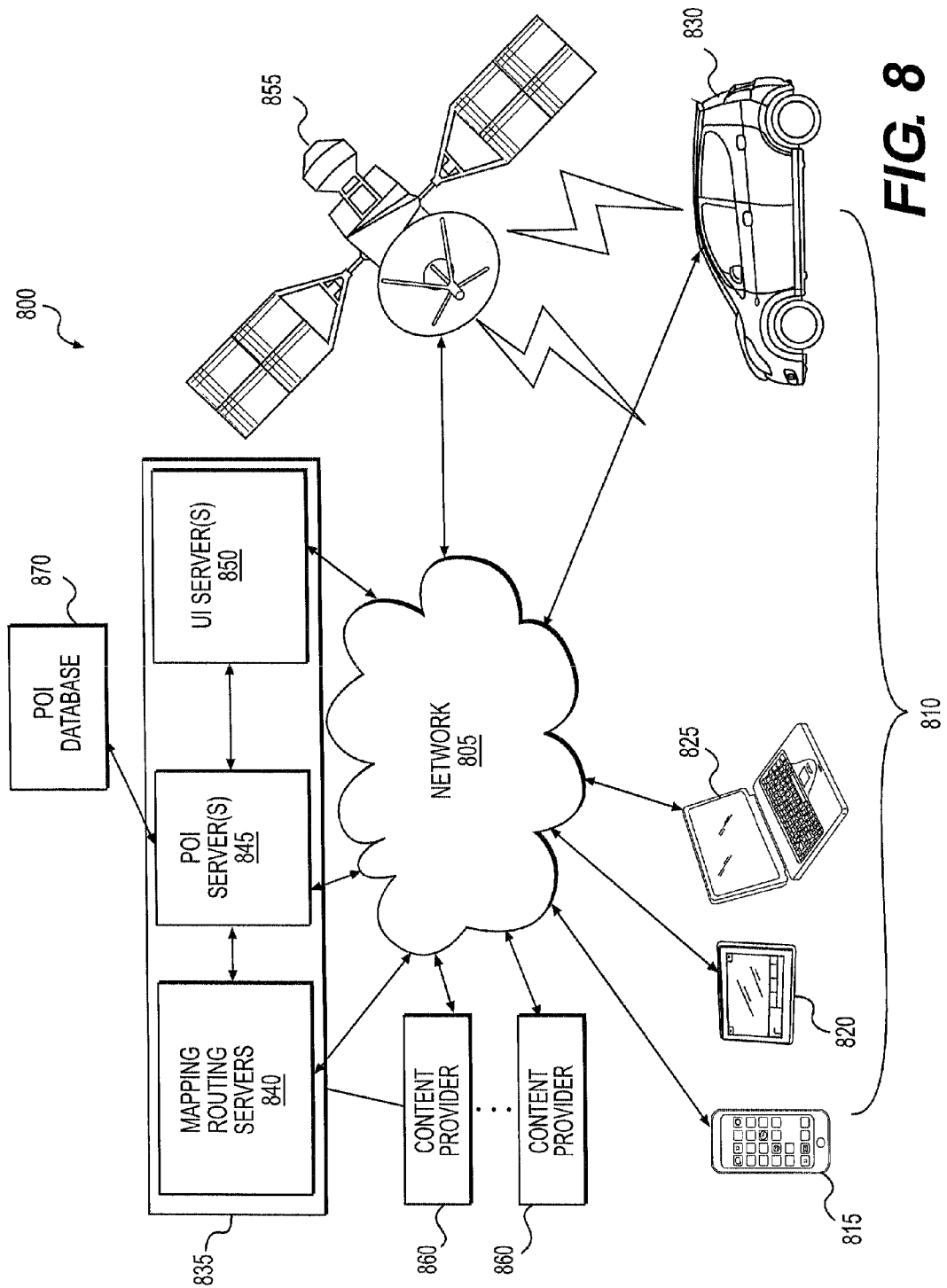
FIG. 8 is a block diagram of a communications system configured to present users with the locations of POIs as a result of multiple queries, according to an exemplary embodiment of the present disclosure.

FIG. 8 is a block diagram of a communications system 800 capable of accessing stored POI data. For example, the system 800 may access and retrieve the POI data stored on POI database 870 via a network 805, such as the Internet. The retrieved pre-calculated POI data may be used for display and/or processing by one or more user devices 810, such as a mobile device 815 (e.g., mobile phone, personal digital assistant, tablet computer), a GPS device 820, a computer (laptop, desktop, tablet) 825, in-vehicle navigation system 830, and/or any device connected to a network 805, such as the Internet, according to an exemplary embodiment of the present disclosure.

In the example shown in FIG. 8, mobile electronic device 815 may be a smartphone, a personal digital assistant ("PDA"), a tablet computer, or other type of mobile computing device, such as a device having a touchscreen display. Mobile device 815 and computer 825 may each be equipped with or include, for example, a GPS receiver for obtaining and reporting location information, e.g., GPS data, via network 805 to and from any of servers 835 and/or one or more GPS satellites 855. GPS device 820 may be a dedicated GPS navigation device having an integrated GPS receiver for exchanging location information with GPS satellite(s) 855 for purposes of tracking a current geographic location of GPS device 820 and its user. GPS device 820 may be a portable or handheld GPS device. Vehicle navigation system 830 may be implemented as, for example, a GPS based in-dash navigation system integrated with the vehicle 830. Such an in-dash navigation system may provide various functions, including a navigation function, via a center console display installed within the vehicle.

However, it should be noted that each of user devices 810, including mobile device 815, GPS device 820, computer 825, and/or vehicle navigation system 830, may be implemented using any type of electronic device configured to send and receive data, including location data (e.g., in the form of latitude and longitude coordinates), to and from a system of servers 835 over network 805. The user input device(s) may include any type or combination of input/output devices, such as a display monitor, touchpad, touchscreen, microphone, camera, keyboard, and/or mouse.

Furthermore, it should be noted that any of various techniques may be used to derive geographic location information for any of user devices 810, particularly in cases where GPS data may not be available, for example, in urban canyons or other locations where line-of-sight to GPS satellites may not be feasible. Examples of other techniques that may be used for deriving location information for any of user devices 810 include, but are not limited to, cell identification (e.g., using Cell ID), cellular tower triangulation, multilateration, Wi-Fi, or any other network or handset based technique for deriving location information for a mobile device. The various user devices 810 may also communicate with each other by any suitable means (e.g., via Wi-Fi, radio frequency (RF), infrared (IR), Bluetooth, Near Field Communication, or any other suitable means) to send and receive location and other information. For example, a mobile device 815 may communicate with GPS device 820 or vehicle navigation system 830.

The user device 810 may receive information via the network 805 from the system of servers 835, having one or more servers such as mapping servers 840, POI servers 845, user interface servers 850, and/or any other suitable servers. Each server may access the POI database 870 to retrieve POI data, such as the data in each of the matrices 805. Each server may include memory, a processor, and/or a database. For example, the mapping server 840 may have a processor configured to retrieve mapping information and generate routing information, POI server 845 may have database that is a subset of POI database 870, and a processor configured to retrieve POI information, provide POI information, etc. The user interface server 850 may be configured to receive and process user input, such as POI preferences. The satellite 855 may be configured to send and receive location and other information to the server system 835 and user devices 810.

The various user devices 810 may communicate with each other by any suitable means (e.g., via the network 805, Bluetooth, Near Field Communication, or any other suitable means) to send and receive location and other information. For example, a mobile device 815 may communicate with a GPS device 820, 830 in communication with the satellite 855.

The mapping server 840 may receive information regarding a current location of a mobile device, regarding a location input by the user, or regarding a user's trip, such as a start location, destination location, and any user route preferences directly from the user device 810 via the network 805 or indirectly via the user interface server 850. The mapping server 840 may save the information in memory, such as a computer readable memory.

The mapping server 840 also may be in communication with one or more other servers, such as the POI server 845 and/or external servers such as servers of content providers 860. The content providers 860 may include advertisers, news sources, entities affiliated with POIs (e.g., ad agents, marketers), review sites, etc. In one embodiment, the content provider 860 may be a gas station owner providing advertisements and information regarding fuel prices for gas stations when a layer related to gas is selected. In other embodiments, the content provider may be restaurants providing advertisement information regarding seasonal menu items and locations to a user that selected a layer related to food. Other examples may include retail stores, amusement parks, etc. providing advertisements about their locations. The POI server 845 may include reviews of POIs, details about POIs and/or any other relevant information. The mapping server 840 and/or the POI server 845 may process the information for display on the user device 810.

Each server in the system of servers 835, including mapping server 840, POI server 845, and UI server 850 may each represent any of various types of servers including, but not limited to a web server, an application server, a proxy server, a network server, or a server farm. Each server in the system of servers 835 may be implemented using, for example, any general-purpose computer capable of serving data to other computing devices including, but not limited to, user devices 810 (including mobile device 815, GPS device 820 and computer 825) or any other computing device (not shown) via network 805. Such a general-purpose computer can include, but is not limited to, a server device having a processor and memory for executing and storing instructions. The memory may include any type of random access memory (RAM) or read-only memory (ROM) embodied in a physical storage medium, such as magnetic storage including floppy disk, hard disk, or magnetic tape; semiconductor storage such as solid-state disk (SSD) or flash memory; optical disc storage; or magneto-optical disc storage. Software may include one or more applications and an operating system. Hardware can include, but is not limited to, a processor, memory, and graphical user interface display. Each server may also have multiple processors and multiple shared or separate memory components that are configured to function together within, for example, a clustered computing environment or server farm.

In an example, each of user devices 810 may be configured to execute a mobile client application for providing various functions of a mapping service hosted at mapping server 840. Examples of such functions may include, but are not limited to, viewing and manipulating digital maps, route planning and navigation, and obtaining information related to various POIs. Such POIs may include, for example and without limitation, landmarks, buildings, public parks, museums, restaurants, gas stations, retail stores, cafes, or any other predefined geographic location associated with a public or private enterprise. The client application executable at each user device 810 may be configured to process and execute instructions and save data in memory. The client application may also be configured to provide the various mapping functions to the user through a GUI, such as GUI 100 presented via a display, e.g., capacitive touch-screen display, coupled to each user device 810. The client application executable at each user device may be a standalone mobile application or may be configured to execute within, for example, a web browser based on web page data loaded within the browser or similar application executable at each of user devices 810.

In a further example, the above-described mapping client application and/or mapping service hosted at mapping server 840 may be configured to communicate with POI server 845 over network 805 for purposes of sending and receiving information related to exits located along a highway and the POIs associated with each exit. Each of mapping server 840 and POI server 845 may be communicatively coupled to, for example, a POI database 870 which may be used to store locations associated POIs.

To implement navigation features of the mobile application, each user device 810 may receive location data from one or more servers in the system of servers 835 via network 805 and/or satellites 855. Such location data may include information regarding a user's trip, such as a start or origin location, a travel route, and a destination location. The mobile application may be any machine-readable code for executing instructions, such as software, configured to be processed by each user device 810. The mobile application may have been downloaded via the network 805 and installed within a memory of each user device 810.

Figure 9:
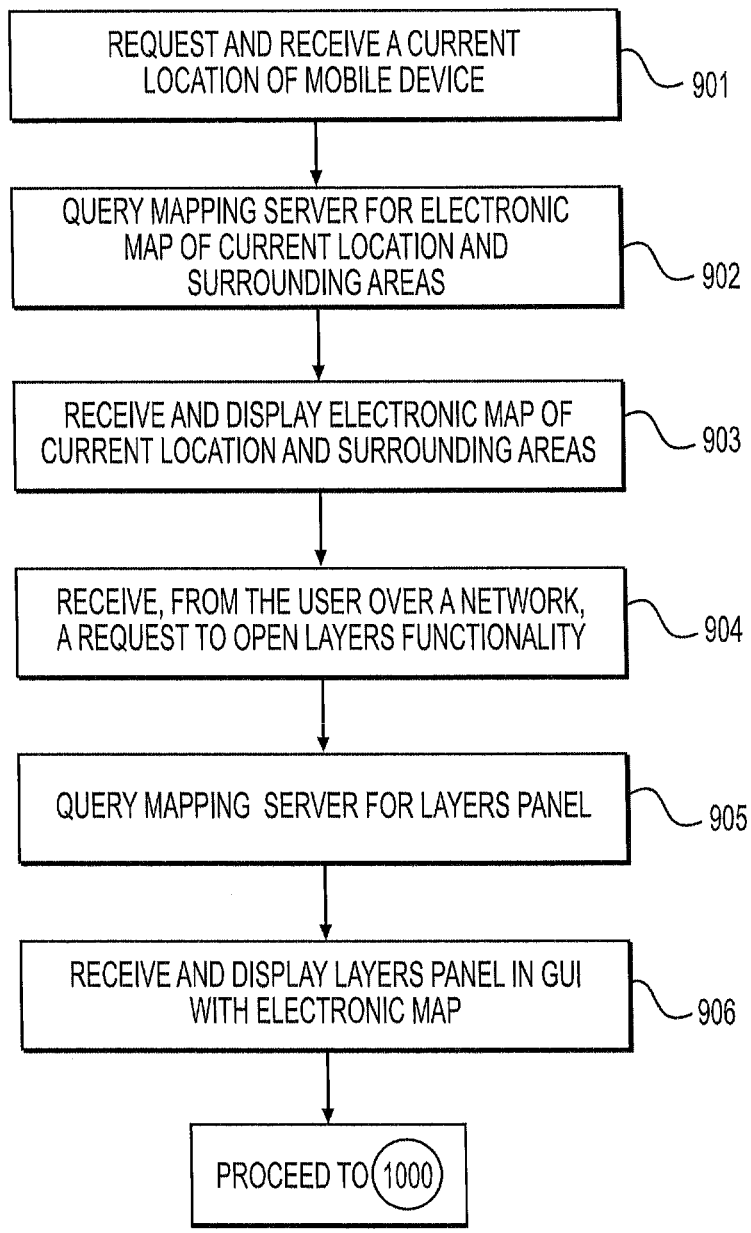
FIG. 9 is a flow diagram of an exemplary method of displaying a digital map and the layers panel, according to an exemplary embodiment of the present disclosure.
Figure 10:
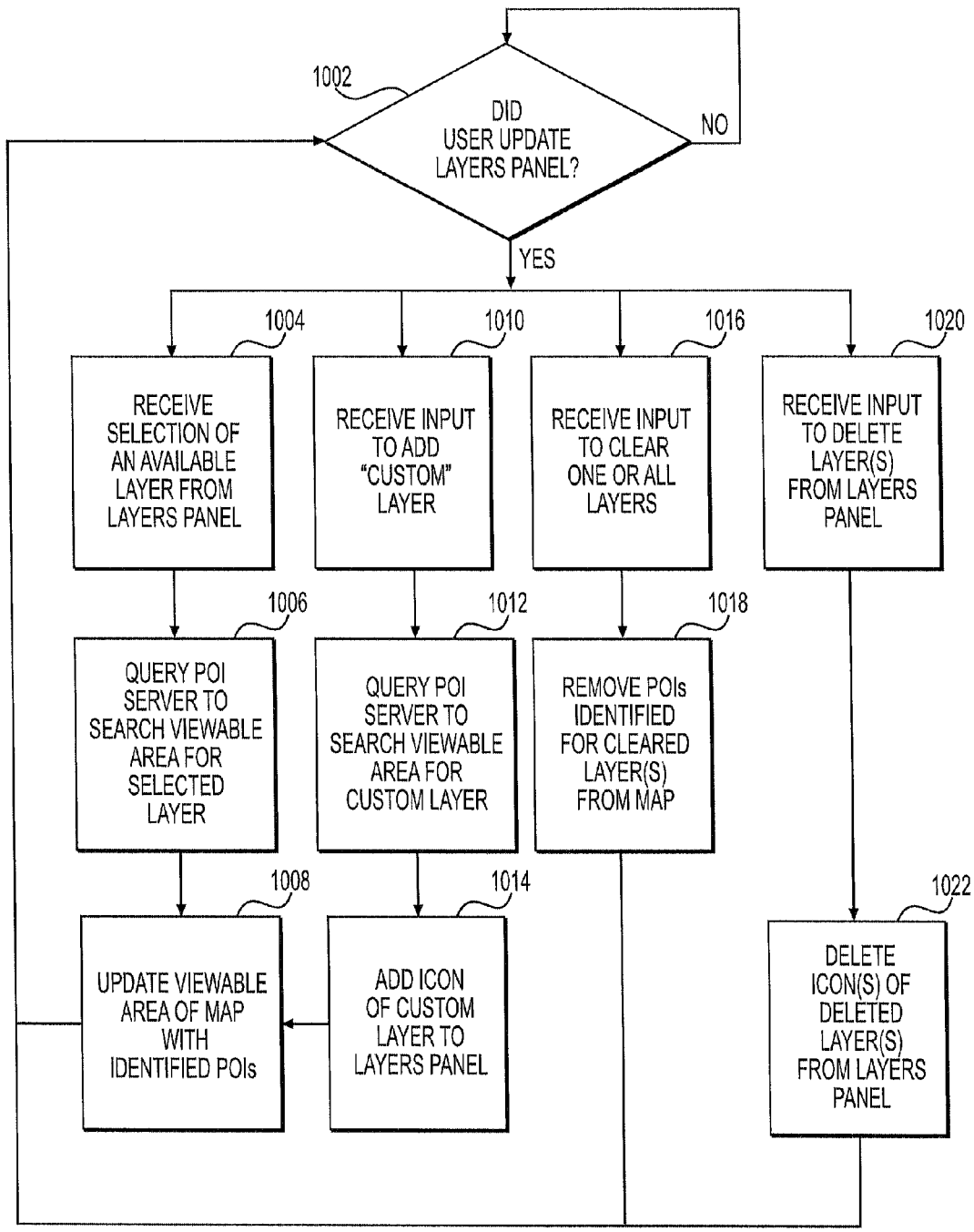
FIG. 10 is a flow diagram of an exemplary method of searching for multiple layers, and displaying on a digital map the locations of POIs as a result of multiple queries, according to an exemplary embodiment of the present disclosure.

FIGS. 9 and 10 are flow diagrams of exemplary methods 900 and 1000 for generating a digital map indicating the locations of POIs based on multiple queries. For example, methods 900 and 1000 may be used to generate custom layers from queries and/or represent the results of multiple queries as layers on digital map 101 and/or 701. For purposes of discussion, methods 900 and 1000 will be described using system 800 of FIG. 8 (including mapping server 840, POI server 845, and POI database 870), as described above, but methods 900 and 1000 are not intended to be limited thereto. As shown in FIGS. 9 and 10, method 900 includes steps 901-906 and method 1000 includes steps 1002, 1004, 1006, 1008, 1010, 1012, 1014, 1016, 1018, 1020, and 1022. However, it should be noted that methods 900 and 1000 may include more or fewer steps as desired for a particular implementation. In an example, one or more of the above-listed steps of methods 900 and 1000 may be executed by POI server 845 of FIG. 8 or mapping server 840 of FIG. 8, as described above. However, methods 900 and 1000 are not intended to be limited thereto, and the steps of methods 900 and 1000 may be performed by any server or other type of computing device having at least one processor, a memory, and a network communication interface for sending and receiving information from one or more user devices.

In one embodiment, method 900 may include a step 901 for requesting and receiving a location from one or more user devices 810, such as a mobile device 815 (e.g., mobile phone, personal digital assistant, tablet computer), a GPS device 820, a computer (laptop, desktop, tablet) 825, in-vehicle navigation system 830, and/or any device connected to a network 805, such as the Internet, according to an exemplary embodiment of the present disclosure. The requested location may be the current location of the user device, and/or the requested location may be a location input by the user. It should be noted that the user may adjust the map. In some circumstances, after the user adjusts the digital map, the current location (and/or requested location) may no longer be within the displayed digital map. The search for selected layers may be of the currently displayed digital map or it may be a certain distance surrounding the current and/or requested location. It should also be noted that as the user and/user device moves, the current location may be updated. The visual representation of the current location and geographic area represented in the digital map may be updated to match. In step 902, the mapping server 840 may be queried for an electronic/digital map of the current and/or requested location and surrounding areas. In step 903, the queried electronic map be received from the mapping server and/or displayed on the user device. In step 904, a request may be received to open layers functionality from the user over network 805. In some embodiments, the electronic map display may include a layers icon, as shown in FIG. 1. The user may select (in any way) this icon. Once a request from the user to open the layers functionality is received, method 900 may proceed to step 905 of querying the mapping server for the layers panel. In step 906, the queried layers panel may be received and displayed in the GUI with electronic map (e.g., digital map 101 of FIGS. 1, 2, 5, and 6). In other implementations, the layers panel may be displayed without the electronic map, in a single screen, or as an overlay over the electronic map. In other embodiments, steps 904-906 may be skipped as the layers panel is automatically displayed when the electronic map is displayed. Similarly, in some embodiments, the mapping server may be queried for the layers panel in step 902, and thus, step 905 may be skipped.

It should be noted that the layers currently displayed in the layer panel may include, but are not limited to, featured layers (e.g., in the featured layers portion 206), pre-set layers (e.g., pre-set layer 304), and/or previously added/custom layers (e.g., layer 402).

After step 906, method 900 may proceed to method 1000. In step 1002 of method 1000, it may be determined whether the user has updated the layers panel. Updating the layers panel (e.g., layers panel 201 of FIGS. 2, 5-6) may include any action by the user. For example, the user may make a selection from an interactive portion of the layers panel. If the user did not update the layers panel, method 1000 may return to 1002. If the user did update the layers panel, method 1000 may proceed to step 1004, 1010, 1016, and/or 1020.

If the update to the layers panel is a selection of a currently displayed layer (e.g., a layer from the layers panel 201, featured layer portion 206, and/or available layers portion 210 of FIGS. 2, 5-6), method 1000 may proceed from step 1004 to step 1006. It should be noted that the layers currently displayed in the layer panel may include, but are not limited, featured layers (e.g., in the featured layers portion 206), pre-set layers (e.g., pre-set layer 304), and/or previously added/custom layers (e.g., layer 402). In step 1006, the POI server may be queried to search the viewable area (e.g., the currently displayed digital map 101) for POIs associated with the selected layer. Once the POI server identifies POIs associated with the selected layer within the visible map, method 1000 may proceed to step 1008. In step 1008, the identified POIs may be added to (e.g., displayed on) the viewable area of a map (e.g., digital map 101 of FIGS. 1, 2, 5, and 6).

If the user updated the layers panel by requesting to add a custom layer, method 1000 may proceed to step 1010. In step 1010, an input to add a custom layer may be received. In some implementations, the user may have selected the add layers portion 204 of FIGS. 2 and 5-6. The method to add a custom layer, described with respect to FIGS. 2-4, may be used. In step 1012, the POI server may be queried to search the viewable area (e.g., the currently displayed digital map 101) for POIs associated with the custom/added layer. In some implementations, method 1000 proceeds directly to step 1008. In other implementations, method 1000 may then proceed to step 1014 and add the custom layer to the layers panel. Once the POIs server identifies POIs associated with the added/custom layer within the visible map, method 1000 may proceed to step 1008. In step 1008, the identified POIs may be added to (e.g., displayed on) the viewable area of a map (e.g., digital map 101 of FIGS. 1, 2, 5, and 6).

If the user updated the layers panel by requesting to clear layer(s), method 1000 may proceed to step 1016. In step 1016, an input from the user to "clear layers" may be received. In step, 1018, all displayed layer indicators (e.g., coffee indicator 305), may be removed from the electronic map (similar to FIG. 2). Additionally or alternatively, only some identified POIs may be removed from the map.

If the user updated the layers panel by requesting to delete layers from the layers panel, method 1000 may proceed to step 1020. In step 1020, an input from the user to remove a layer(s) may be received. In step, 1020, the layer(s) selected for deletion may be removed from the layers panel. The user may be able to delete any layer from the layers panel, or any subcategory, including but not limited to, layers in the available layers portion, layers in the featured layers portions, and/or added/custom layers. Upon completion of steps 1008, 1018, and/or 1022, method 1000 may proceed to step 1002.

Figure 11:
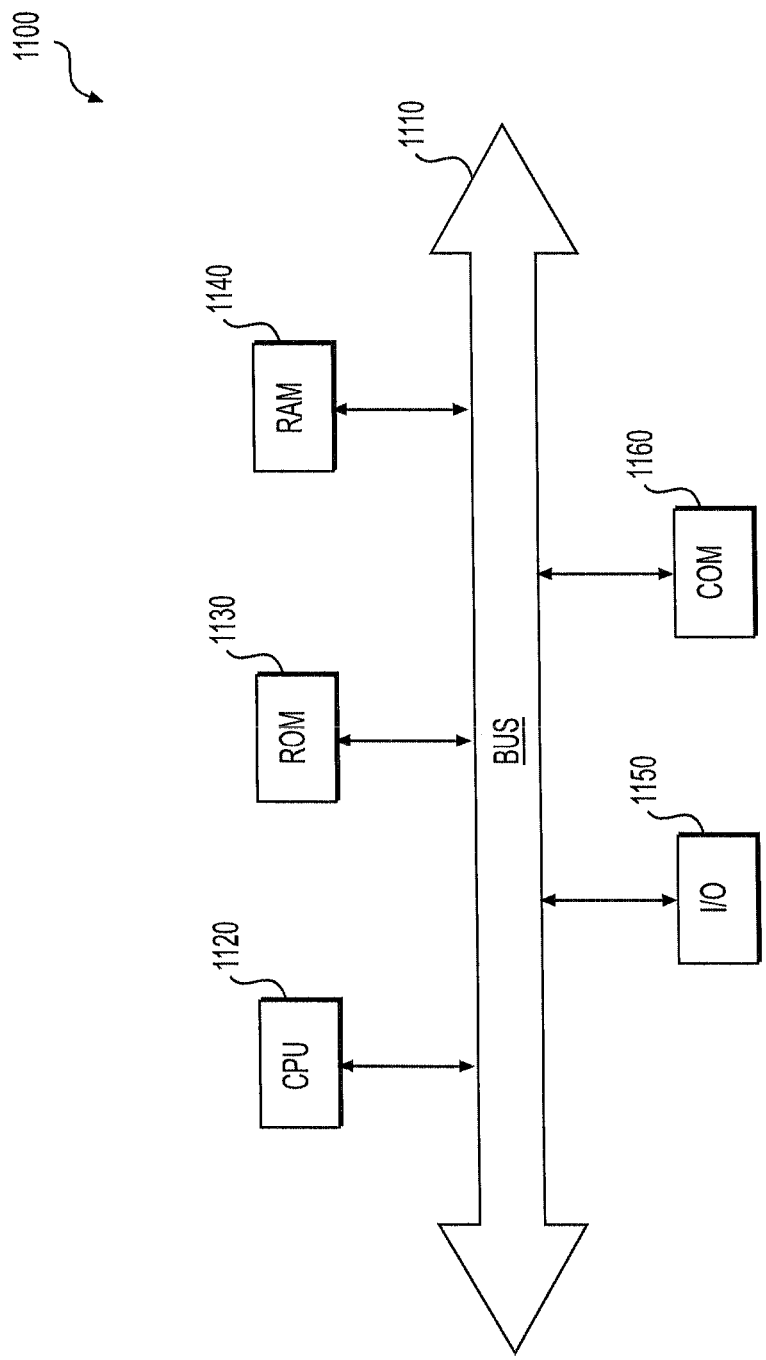
FIG. 11 is a block diagram of an exemplary computer system in which embodiments of the present disclosure may be implemented.

FIG. 11 provides a functional block diagram illustration of general-purpose computer hardware platforms. FIG. 11 illustrates a network or host computer platform 1100, as may typically be used to implement a server like the mapping server system 840. It is believed that those skilled in the art are familiar with the structure, programming, and general operation of such computer equipment and as a result, the drawings should be self-explanatory.

A platform for a server or the like 1100, for example, may include a data communication interface for packet data communication 1160. The platform may also include a central processing unit (CPU) 1120, in the form of one or more processors, for executing program instructions. The platform typically includes an internal communication bus 1110, program storage, and data storage for various data files to be processed and/or communicated by the platform such as ROM 1130 and RAM 1140, although the server 1100. The hardware elements, operating systems, and programming languages of such equipment are conventional in nature, and it is presumed that those skilled in the art are adequately familiar therewith. The server 1100 also may include input and output ports 1150 to connect with input and output devices such as keyboards, mice, touchscreens, monitors, displays, etc., and communication ports 1160. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for searching and displaying multiple layers of points of interest on a digital map, the method comprising:

receiving, from a user's electronic device and over a network, a location;

displaying, on the user's electronic device, a layers panel, and a digital map of the location and an area around the location, wherein the layers panel includes a plurality of selectable icons, and each selectable icon identifies a class of points of interest (POIs) having goods or services associated with the class or with an identifier received over a network from the user's electronic device;

receiving, from the user's electronic device and over the network, a first selection of a first selectable icon from the layers panel;

retrieving, from an electronic database, POIs associated with the first selection;

displaying, within the digital map, the POI data associated with the first selection;

receiving, from the user's electronic device and over the network, a second selection of a second selectable icon from the layers panel;

retrieving, from the electronic database, POIs associated with the second selection; and displaying, within the digital map, the POI data associated with the first selection and the POI data associated with the second selection.

2. The method of claim 1, wherein at least one of the first selection and the second selection is a pre-set layer from the electronic database.

3. The method of claim 1, further comprising receiving, from the user's electronic device and over the network, a selection to add a custom layer;

retrieving, from the electronic database, POIs associated with the custom layer;

displaying in the layers panel a custom selectable icon defining a class of POIs associated with the custom layer.

4. The method of claim 1, further comprising:

receiving, from the user's electronic device and over the network, a third selection of a third selectable icon from the layers panel;

retrieving, from the electronic database, POIs associated with the third selection;

displaying, within the digital map, the POI data associated with the first selection, the POI data associated with the second selection, and the POI data associated with the third selection.

5. The method of claim 1, further comprising:

receiving, from the user's electronic device and over the network, an instruction to clear all layers; and removing, from the digital map, the POI data associated with the first selection and the second selection.

6. The method of claim 1, further comprising:

receiving, from the user's electronic device and over the network, an instruction to delete a selectable icon for deletion from the layers panel; and removing, from the layers panel, the selectable icon for deletion.

7. The method of claim 1, wherein the digital map includes a navigation route.

8. The method of claim 1, further comprising:

receiving input to filter the POI data; and filtering the POI data associated with the first selection and the second selection.

9. The method of claim 1, wherein the displayed POI data is interactive.

10. The method of claim 1, wherein, prior to receiving a first selection of a first selectable icon, no POI data associated with the first selection is displayed on the distal map.

11. The method of claim 2, further comprising:

setting the pre-set layer based on popularity of POIs.

12. The method of claim 3, further comprising:

without additional user action, displaying within the digital map, the POI data associated with the custom layer.

13. The method of claim 3, further comprising:

receiving, from the user's electronic device and over the network, a selection of the custom selectable icon from the layer panel; and displaying within the digital map, the POI data associated with the custom layer.

14. The method of claim 3, further comprising:

displaying a list of popular custom layers for the user to select as the custom layer.

15. The method of claim 3, further comprising:

providing the user with a text box to enter text associated with a desired custom layer.

16. The method of claim 3, wherein the added custom layer may be a category layer or a franchise layer.

17. The method of claim 3, wherein at least one of the first selection and the second selection is the custom selectable icon.

18. The method of claim 12, wherein the list of popular custom layers consists of category layers.

19. A system for searching and displaying multiple layers of points of interest on a digital map, the system comprising:

a memory having processor-readable instructions stored therein; and a processor configured to access the memory and execute the processor-readable instructions, which when executed by the processor configures the processor to perform a plurality of functions, including functions to:

receive, from a user's electronic device and over a network, a location;

display, on the user's electronic device, a layers panel, and a digital map of the location and an area around the location, wherein the layers panel includes a plurality of selectable icons, and each selectable icon identifies a class of point of interest (POIs) having goods or services associated with the class or with an identified received over a network from the user's electronic device;

receive, from the user's electronic device and over the network, a first selection of a first selectable icon from the layers panel;

retrieve, from an electronic database, POIs associated with the first selection;

display, within the digital map, the POI data associated with the first selection;

receive, from the user's electronic device and over the network, a second selection of a second selectable icon from the layers panel;

retrieve, from the electronic database, POIs associated with the second selection; and display, within the digital map, the POI data associated with the first selection and the POI data associated with the second selection.

20. A computer readable medium storing instructions that, when executed by a computer, cause the computer to perform a method of searching and displaying multiple layers of points of interest on a digital map, the method including:

receiving, from a user's electronic device and over a network, a location;

displaying, on the user's electronic device, a layers panel, and a digital map of the location and an area around the location, wherein the layers panel includes a plurality of selectable icons, and each selectable icon identifies a class of points of interest (POIs) having goods or services associated with the class or with an identifier received over a network from the user's electronic device;

receiving, from the user's electronic device and over the network, a first selection of a first selectable icon from the layers panel;

retrieving, from an electronic database, POIs associated with the first selection;

displaying, within the digital map, the POI data associated with the first selection;

receiving, from the user's electronic device and over the network, a second selection of a second selectable icon from the layers panel;

retrieving, from the electronic database, POIs associated with the second selection; and displaying, within the digital map, the POI data associated with the first selection and the POI data associated with the second selection.

* * * * *